(12) United States Patent
Kreifels et al.

(10) Patent No.: US 7,991,657 B2
(45) Date of Patent: Aug. 2, 2011

(54) EFFICIENT RETRIEVAL OF RETURN ASSEMBLIES FOR OPTIMIZED PARTS FULFILLMENT

(75) Inventors: Brian T. Kreifels, Rochester, MN (US); Ryan T. Paske, Rochester, MN (US); William R. Taylor, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 12/020,952

(22) Filed: Jan. 28, 2008

(65) Prior Publication Data

US 2009/0192923 A1 Jul. 30, 2009

(51) Int. Cl.
*A01K 5/02* (2006.01)
(52) U.S. Cl. ......... 705/29; 705/7; 705/8; 705/9; 705/16; 705/22; 705/27; 705/28; 705/30; 700/95; 700/99; 700/106; 700/214
(58) Field of Classification Search ........ 705/29
See application file for complete search history.

(56) References Cited

U.S. PATENT DOCUMENTS

| | | | |
|---|---|---|---|
| 7,136,713 B2 * | 11/2006 | Mok et al. | 700/95 |
| 2004/0236641 A1 * | 11/2004 | Abbott et al. | 705/28 |
| 2007/0282618 A1 * | 12/2007 | Barahona et al. | 705/1 |

OTHER PUBLICATIONS

Sasson, Joseph R Douglas, Ian. "A conceptual integration of performance analysis, knowledge management, and technology: from concept to prototype." Journal of Knowledge Management, v10n6, p. 81-99, 2006 (includes Diagrams Illustrations References Tables).*
Gerber, et al, U.S. Appl. No. 11/677,093, entitled, "Inventory Mechanism that Generates Logical Inventory From Assemblies in Inventory", filed Feb. 21, 2007.

* cited by examiner

*Primary Examiner* — F. Zeender
*Assistant Examiner* — Fawaad Haider
(74) *Attorney, Agent, or Firm* — Martin & Associates, LLC; Bret J. Petersen (57) ABSTRACT

A method and apparatus for a pull back optimizer in conjunction with an inventory management system allows for efficient retrieval of return assemblies for optimized parts fulfillment. The inventory management system includes a return assembly inventory and a list of parts needed for order fulfillment. The return assembly inventory lists the part numbers and quantities of parts in each return assembly. The pull back optimizer allows a user of the inventory management system to efficiently determine the optimal return systems to pull back to production for parts fulfillment to minimize the impact on those using the return assemblies.

17 Claims, 8 Drawing Sheets

EFFICIENT RETRIEVAL OF RETURN ASSEMBLIES FOR OPTIMIZED PARTS FULFILLMENT

BACKGROUND

1. Technical Field

This disclosure generally relates to inventory management systems, and more specifically relates to a method and apparatus for a pull back optimizer in an inventory management system for efficient retrieval of return assemblies for optimized parts fulfillment.

2. Background Art

Modern manufacturing often relies on just-in-time (JIT) inventory techniques to reduce the size of parts inventories. Reducing inventories reduces manufacturing costs. While smaller inventories reduce costs, there are times when key parts are needed but unavailable. Routinely there are unexpected delays in parts or new orders exceed expected demand. This may result in orders lacking a few parts before shipment is possible. Further, to make quarterly revenue goals, manufacturing may need to immediately ship some of these orders. Thus, only a few specific parts may be lacking to be able to ship and bill key customer orders.

In some manufacturing environments, there are parts available to manufacturing in return assemblies. These return assemblies may be in the form of loaner assemblies or systems that are built up of new parts and are used internally by the company for a short period of time. These return or loaner assemblies are often used for testing of the product or for product development. These systems are scheduled to come back to manufacturing for disassembly so the parts can be reused. These return assemblies can be called back to fulfill parts requirements described above. However, it is disruptive to the testing and product development teams to have these systems returned early. Other return assemblies may be in the form of completed assemblies that do not need to ship until a future date or assemblies that have been shipped to a customer but are being returned unsold.

In the prior art it was common procedure to manually determine which return assemblies should be returned to production to provide the needed parts. Manual determination of assemblies to pull back to production does not insure an optimal solution that prioritizes the return assemblies based on the quantity and mix of parts to supply the needed parts with the fewest number of return assemblies and the lowest impact on those using the return assemblies. Without a way to more effectively manage pull back of return assemblies, the manufacturing industry will continue to suffer from less efficient ways of handling parts fulfillment for priority orders and to meet end of quarter shipping goals.

BRIEF SUMMARY

The disclosure and claims herein are directed to a method and apparatus for a pull back optimizer in conjunction with an inventory management system to perform efficient retrieval of return assemblies for optimized parts fulfillment. The inventory management system includes a return assembly inventory and a list of parts needed for order fulfillment. The return assembly inventory lists the part numbers and quantities of parts in each return assembly. The pull back optimizer allows a user of the inventory management system to efficiently determine the optimal return systems to pull back for parts fulfillment to minimize the impact on those using the return assemblies.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The claims and disclosure herein provide a method and apparatus for a pull back optimizer in conjunction with an inventory management system for efficient retrieval of return assemblies for optimized parts fulfillment. The inventory management system includes a return assembly inventory and a list of parts needed for order fulfillment. The return assembly inventory lists the part numbers and quantities of parts in each return assembly. The pull back optimizer allows a user of the inventory management system to efficiently determine the optimal return systems to pull back for parts fulfillment to minimize the impact on those using the return assemblies.

Figure 1:
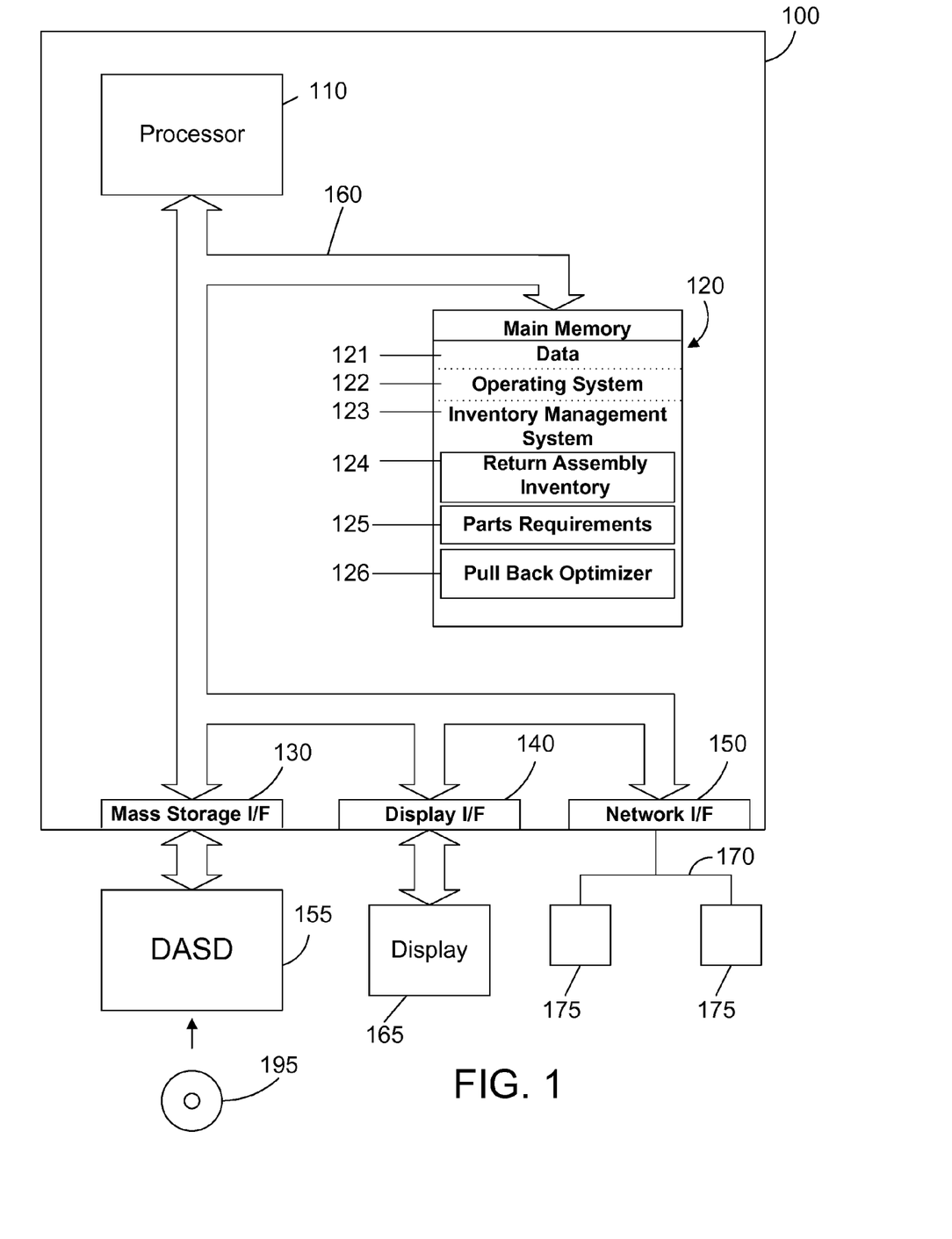
FIG. 1 is a block diagram of an apparatus with an inventory management system with a pull back optimizer 126.

Referring to FIG. 1, a computer system 100 is one suitable implementation of a computer system that includes a logical inventory mechanism that takes into account inventory of parts that are already assembled in assemblies when determining purchase requirements. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122 and an inventory management system 123. Data 121 represents any data that serves as input to or output from any program in computer system 100. Operating system 122 is a multitasking operating system known in the industry as i5/OS; however, those skilled in the art will appreciate that the spirit and scope of this disclosure is not limited to any one operating system. Inventory management system 123 includes a return assembly inventory 124, parts requirements 125, and a pull back optimizer 126. The return assembly inventory 124 includes a list of part numbers and quantities of parts in each return assembly. The parts requirements 125 are a list of part numbers that are lacking in order to fulfill current orders or end of quarter shipping requirements. The pull back optimizer 126 allows a user of the inventory management system to efficiently determine the optimal return systems to pull back for parts fulfillment to minimize the impact on those using the return assemblies.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, inventory management system 123, return assembly inventory 124, parts requirements 125, and pull back optimizer 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a logical inventory mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

At this point, it is important to note that while the description above is in the context of a fully functional computer system, those skilled in the art will appreciate that the logical inventory mechanism may be distributed as an article of manufacture in a variety of forms, and the claims extend to all suitable types of computer-readable media used to actually carry out the distribution, including recordable media such as floppy disks and CD-RW (e.g., 195 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The claims and disclosure herein provide a method and apparatus for a pull back optimizer in conjunction with an inventory management system for efficient retrieval of return assemblies for optimized parts fulfillment. The pull back optimizer allows a user of the inventory management system to efficiently determine the optimal return systems to pull back for parts fulfillment to minimize the impact on those using the return assemblies. The pull back optimizer determines the net short parts requirements after return of any assemblies that are scheduled to be returned. This can be done by setting the return window initially to the need date of the parts. The return window is a date window to look for parts from returning assemblies. The user or the pull back optimizer can set the return window. The return window is then offset where needed to find additional parts. The window offset is an adjustment to the return window. The window offset is some number of days earlier than the initial return window. The return window thus looks back some number of days to return return assemblies prior to their scheduled return date to supply parts for production by the need date of the parts. The pull back optimizer determines the optimum candidate for return as described below.

Figure 2:
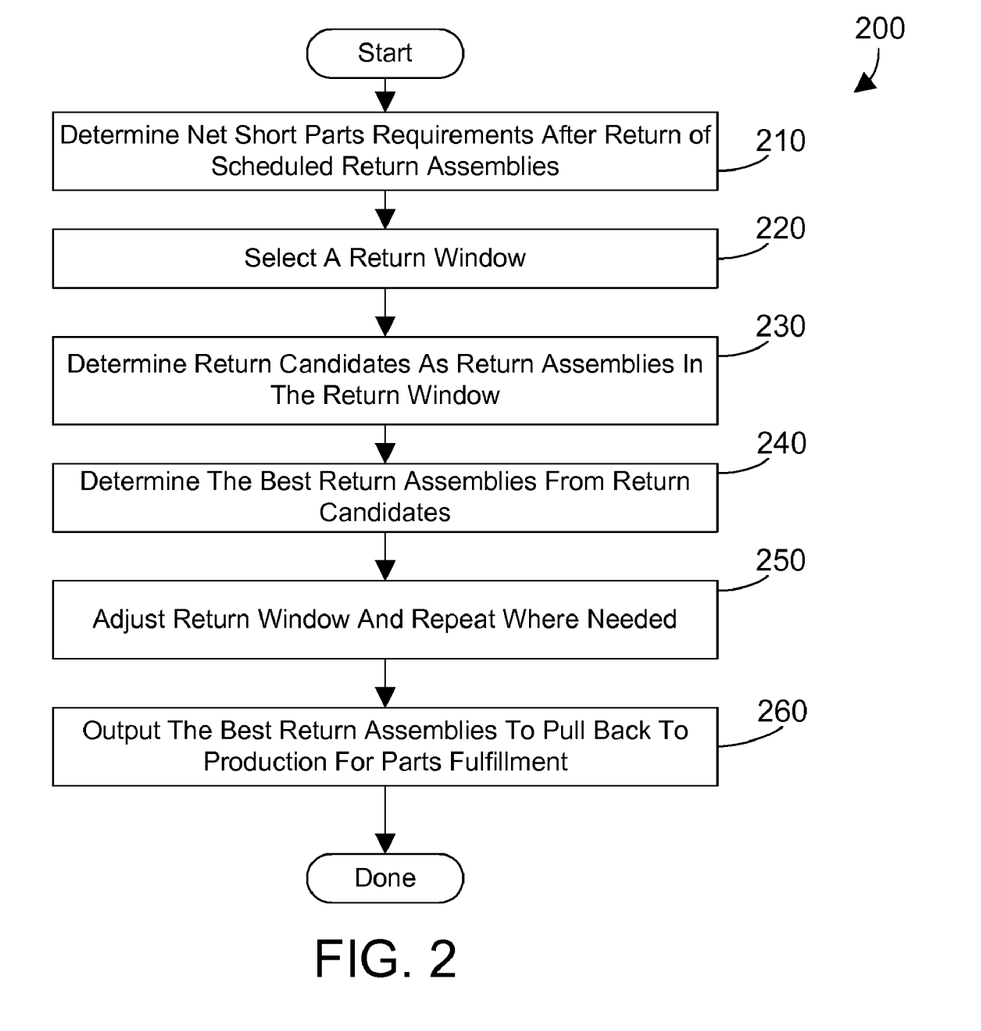
FIG. 2 is a high-level flow diagram of a method for the pull back optimizer 126 in FIG. 1.

FIG. 2 is a high-level flow diagram of a method 200 that may be performed by the pull back optimizer 126 (described above with reference to FIG. 1). First determine the parts required for manufacturing an assembly after return of any scheduled return assemblies (step 210). Then, select an offset window (step 220). Then determine return candidates as any return assemblies that fall in the accelerated return window (step 230). Next, determine the optimum return candidates to return to production to meet the net short parts requirements (step 240). Next, adjust the accelerated return window and repeat the steps 230 and 240 if needed (step 250). Finally, output the best return assemblies from the return candidates to pull back to production for parts fulfillment (step 260). The method is then done. This method is described in further detail with reference to in FIGS. 3 and 4 below.

Figure 3:
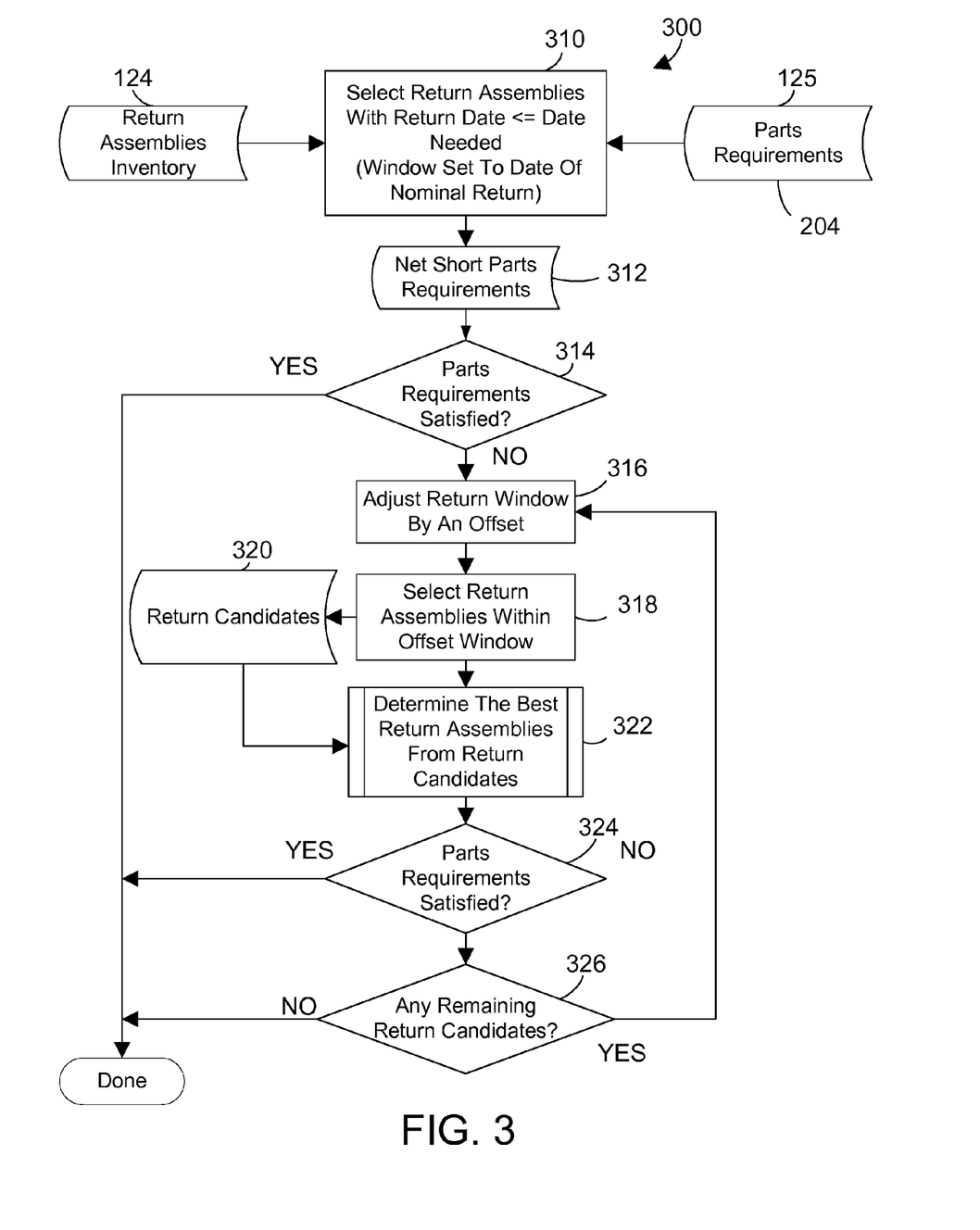
FIG. 3 is a flow diagram of a method for the pull back optimizer 126 in FIG. 1.

FIG. 3 is a more detailed flow diagram of a method 300 that may be performed by the pull back optimizer 126 described above with reference to FIG. 1. The first step determines the parts required for manufacturing an assembly after return of any scheduled return assemblies (step 310). This is done by selecting all the return assemblies 124 with a return date that is less than or equal to the date needed for the parts in the parts requirements 125 to create a net short parts requirements 312 (step 310). If the parts requirements are satisfied (no net short parts) (step 314=yes) then the method is done. If the parts requirements are not satisfied (step 314=no) then adjust the return date window by an offset (step 316). Then select the return assemblies with a return date within the offset window (step 318) to determine the return candidates 320. Next, using the return candidates 320, determine the best return assemblies from the return candidates 322 for accelerated return (optimum return assemblies to return early to meet the net short parts requirements) (step 322). If the parts requirements are satisfied (step 324=yes) then the method is done. If the parts requirements are not satisfied (step 324=no) then determine if there are any remaining return candidates (step 326). If there are no more return candidates (step 326=no) then the method is done. If there are more return candidates (step 326=yes) then adjust the widow offset by an additional amount (step 316) and continue from step 316 with the new offset.

Figure 4:
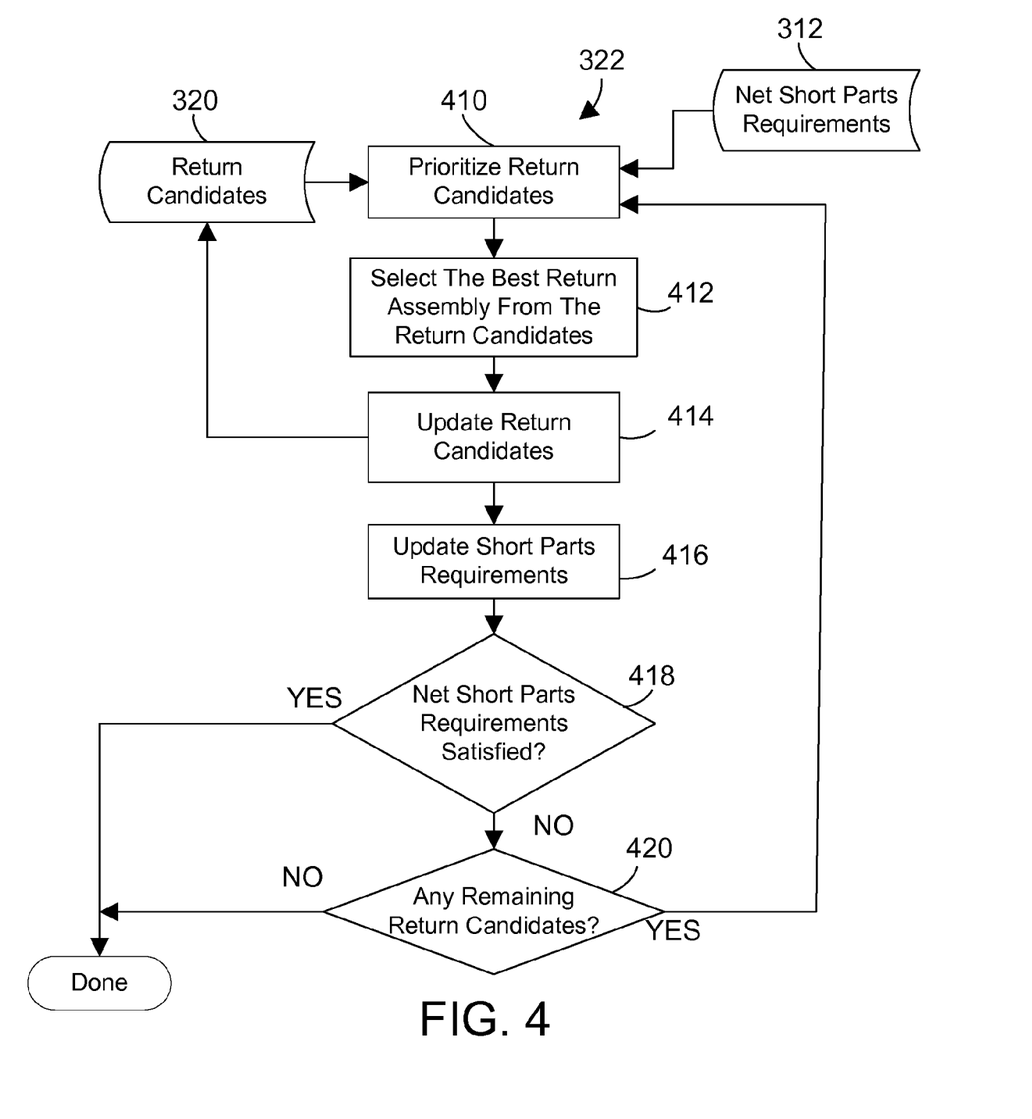
FIG. 4 is a method flow diagram that illustrates one possible implementation of step 322 in FIG. 3.

Referring to FIG. 4, a method 322 is one suitable implementation of step 322 in method 300 in FIG. 3. First, method 322 prioritizes the return candidates 320 for the needed net short parts requirements 312 (step 410). To prioritize the return candidates, the return assemblies that contain the greatest number of needed parts in the short parts requirements are given the highest priority. Next, select the best return assembly (the return assembly in the return candidates with the highest priority) (step 412). Then update the return candidates 320 by removing the best return assembly (step 414). Then update the short parts requirements by removing those parts that will be supplied by the best return assembly chosen above (step 416). If the net short parts requirements have been met (step 418=yes) then the method is done. If the net short parts requirements have not been met (step 418=no), then determine if there are any remaining return candidates (step 420). If there are no more remaining return candidates (step 420=no) then the method is done. IF there are remaining return candidates (step 420=yes) then return to step 410 to prioritize the return candidates with the updated return candidates 320 and the updated net short parts requirements 312 (step 410).

Figure 5:
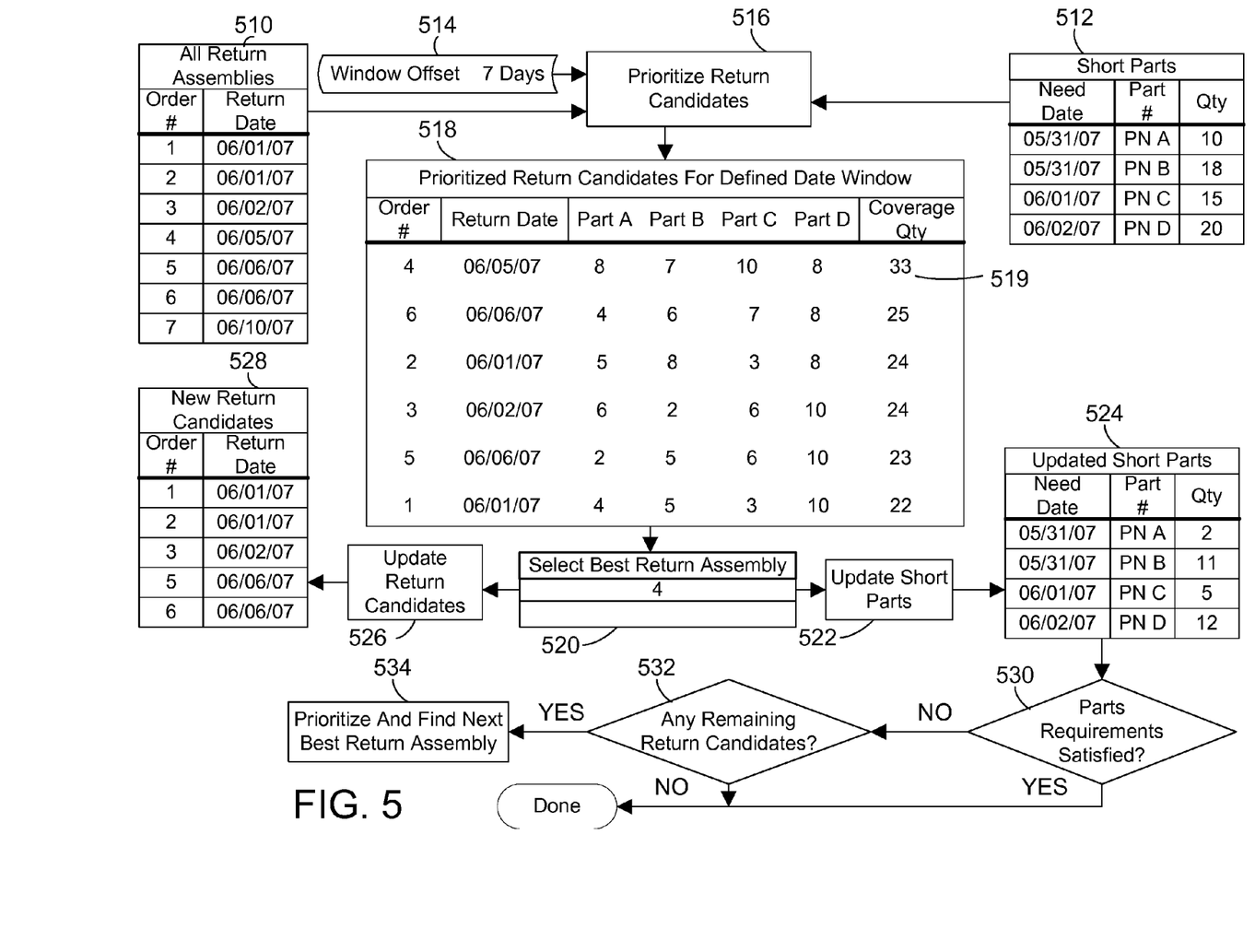
FIGS. 5-7 are block diagrams that illustrates an example of the method described in FIGS. 3 and 4.
Figure 6:
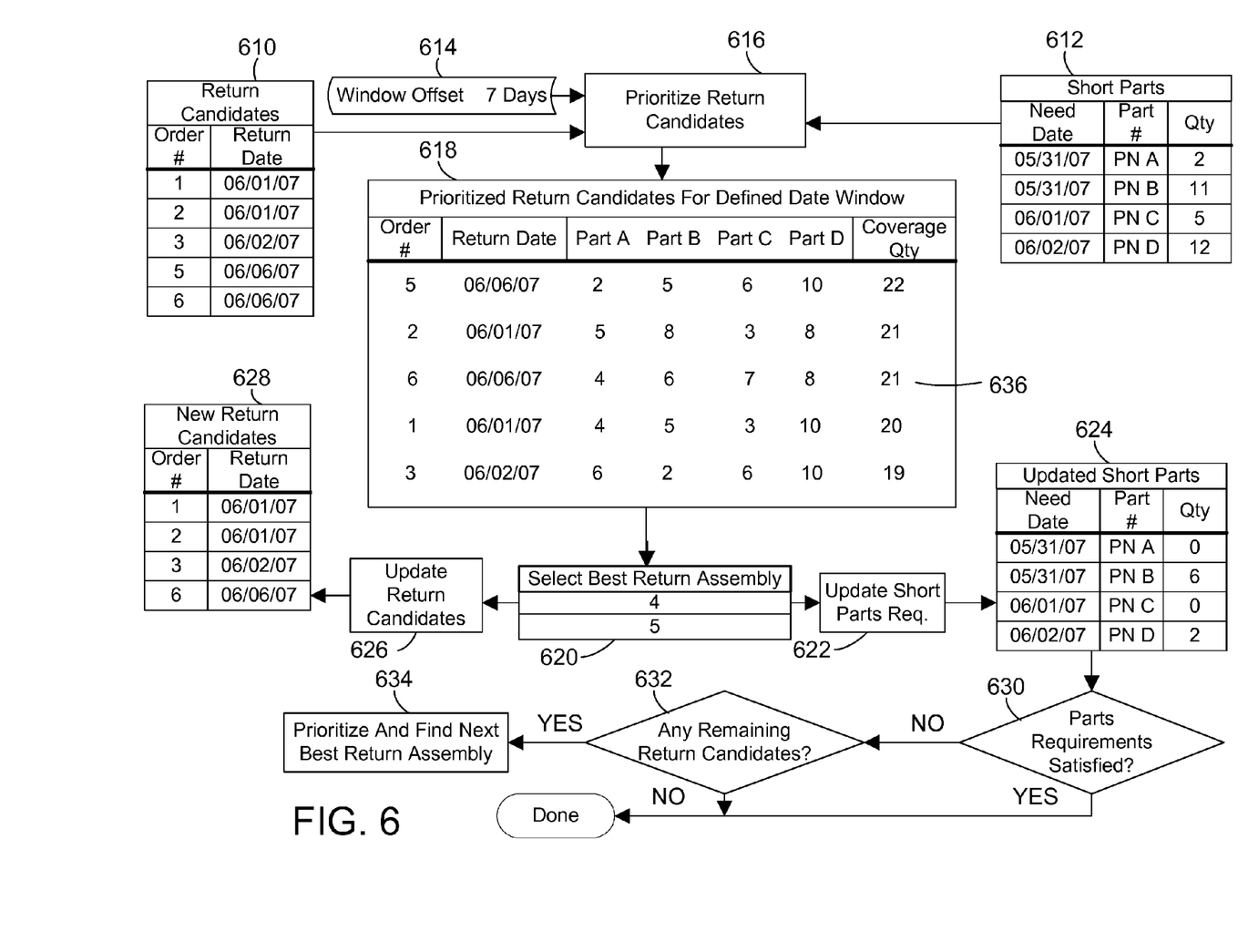
Figure 7:
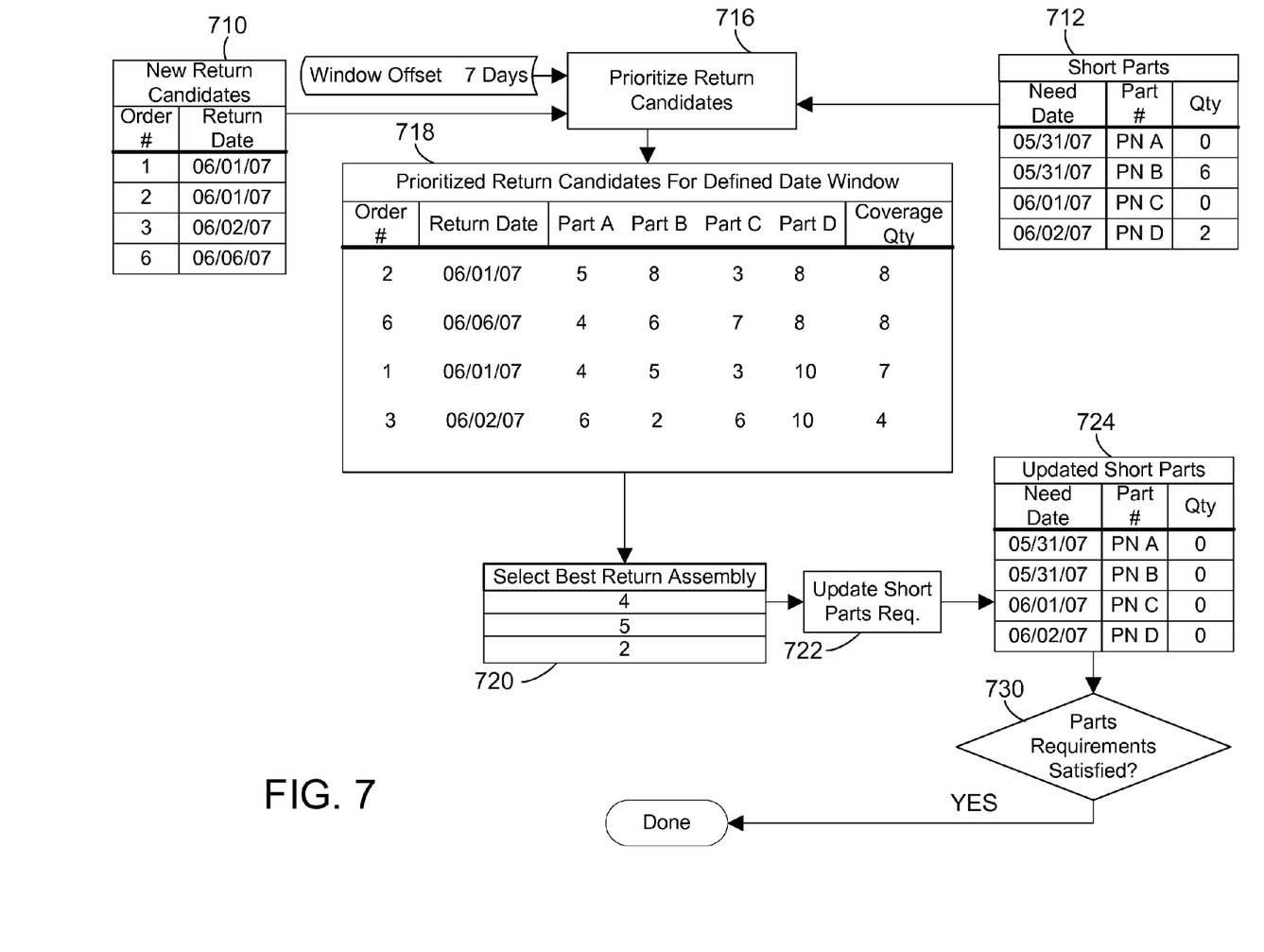

FIGS. 5-7 illustrate an example of a pull back optimizer 126 (FIG. 1) that determines the optimal or best return assemblies to pull back to production to supply needed parts as described herein. The layout of the example in FIGS. 5-7 roughly corresponds to the method flow in FIG. 4. Beginning the example in FIG. 5, all the return assemblies that are available for return are listed in the table 510, where each assembly order number is listed with the expected return date of the assembly. The pull back optimizer will determine the optimum assemblies to pull back prior to the expected return date. The short parts needed by production are listed in table 512 with the quantity of each part needed by a specific date. The widow offset 514 for this example is set at 7 days. This means that a date window offset has been chosen of 7 days to look for parts available by returning assemblies 7 days earlier than indicated by their return date.

Again referring to FIG. 5, and with the input as described above, the pull back optimizer prioritizes the return candidates 516 of all the return assemblies within the window offset. In this example, the latest need date for the parts in the short parts 512 is Jun. 2, 2007, so Order #'s 1 through 6 are prioritized as shown in the table 518. Note Order #7 is not listed and prioritized in the table because it's expected return date (Jun. 10, 2007) falls outside the widow offset 514 to the need date of the parts. The orders are prioritized by listing in descending order the orders that contain the greatest number of short parts. In the example of FIG. 5, Order #4 has the highest priority since it has a coverage quantity of "33" 519, meaning it has 33 parts listed in the shorts parts table 512. The pull back optimizer would thus select order number 4 as the best return assembly 520. The return candidates are updated 526 as shown in new return candidates table 528. The new return candidates are prioritized and used for the next step described below. The pull back optimizer also updates the short parts requirements 522 as shown in the updated short parts table 524. The pull back optimizer determines the parts requirements are not satisfied 530 as shown in table 524, and that there are remaining return candidates 532 as shown in the new return candidates table 528. In this situation, the pull back optimizer will re-prioritize the return candidates and find a next best return assembly 534. Note, this is equivalent to returning to step 410 in FIG. 4.

Referring now to FIG. 6, the selection of the second return assembly is illustrated. The return candidates 610 have been updated as described above. The return candidates 610 are now the new return candidates 528 shown in FIG. 5. The short parts table 612 has also been updated as described above. The window offset 614 remains the same as described above. The pull back optimizer now prioritizes 616 the return candidates 610 to the table as shown 618. The pull back optimizer selects the best return assembly 620, which is Order #5. The return candidates are updated 626 as shown in new return candidates table 628 to be used for the next step described below. The pull back optimizer also updates the short parts requirements 622 as shown in the updated short parts table 624. The pull back optimizer determines the parts requirements are not satisfied 630 as shown in table 624, and that there are remaining return candidates 632 as shown in the new return candidates table 628. Thus, the pull back optimizer will re-prioritize the return candidates and find a next best return assembly 634. Note that the coverage quantity 636 for Order #6 is 21 and not the sum of the individual parts (25). This is because the maximum number of a given part included in the coverage quantity is limited by the number of that part number that is needed per the shorts parts list 612. Thus, since there are more of parts PNA and PNC than needed, the coverage quantity for Order #6 is lower than the total.

Referring now to FIG. 7, the selection of the third return assembly is illustrated. The return candidates 710 have been updated as described above. The return candidates 710 are now the new return candidates 628 in FIG. 6. The short parts table 712 has also been updated as described above. The pull back optimizer now prioritizes 716 the return candidates 710 to the table as shown 718. The pull back optimizer selects the best return assembly 720, which is Order #2. The pull back optimizer updates the short parts requirements 722 as shown in the updated short parts table 724. The pull back optimizer determines the parts requirements are satisfied 630 as shown in table 724. Thus the pull back optimizer is done, and has determined that the best return assemblies are Order #4, #5 and #2. The best return assemblies can be given a priority in the order they were selected since the first selected assemblies supply a greater number of needed parts.

Figure 8:
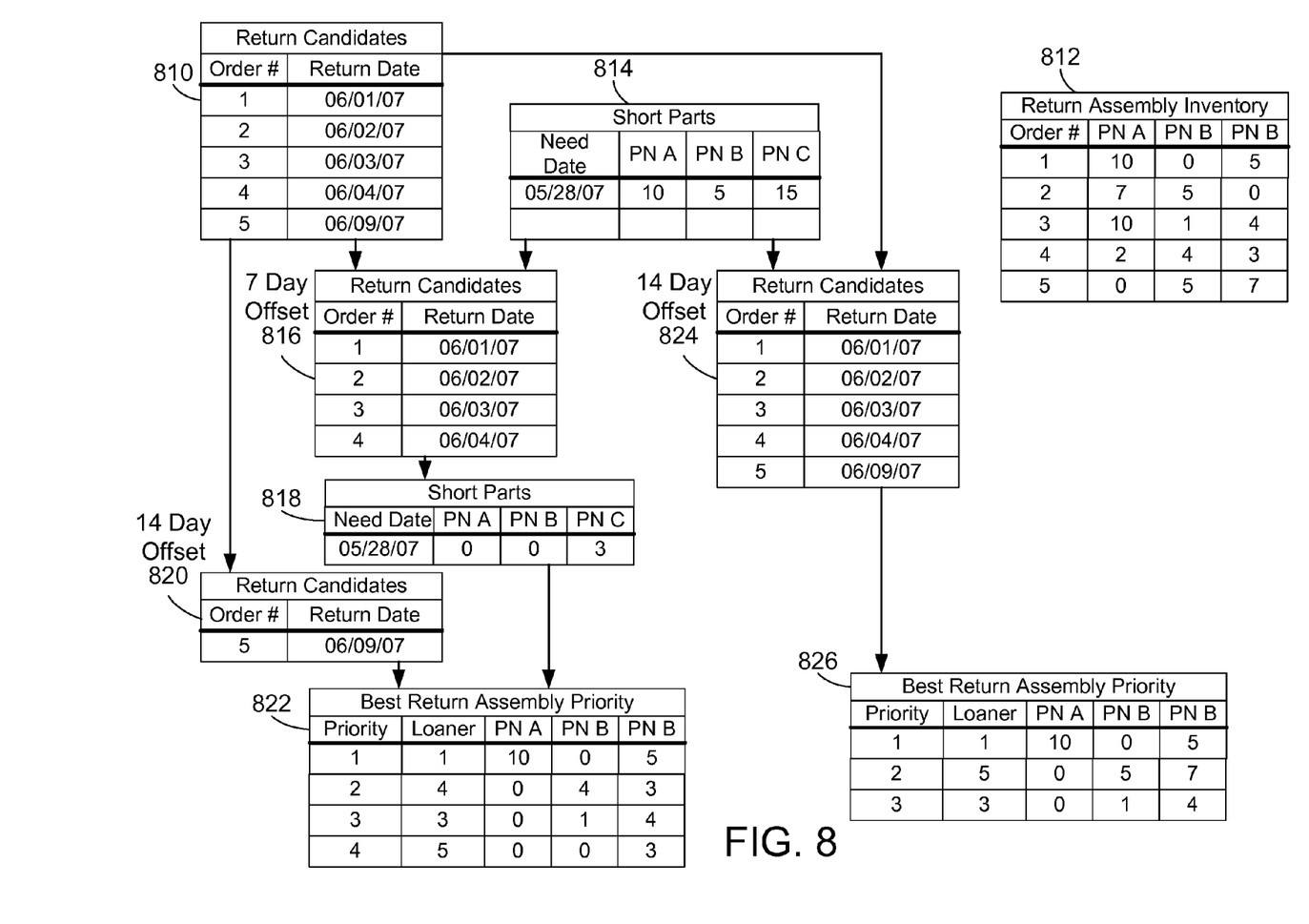
FIG. 8 is a block diagram that illustrates an example where the impact on users of return assemblies can be optimized by examining a larger offset window.

FIG. 8 shows an example of how changing the offset window may impact the return assemblies that are selected. For this example, we assume there are return candidates 810 with order numbers and return dates as shown. The order #'s can supply corresponding part numbers as shown in the assembly inventory 812. We assume the short parts are as listed 814 and then generate a return candidates table for a 7 day offset 816. After using all the available parts from the return candidates 816, there are remaining parts needed 818. If we increase the window offset to 14 days, then Order #5 is now a return candidate 820. Including Order #5 supplies the needed parts and results in a best return assembly priority 822 that includes Order #'s 1, 2, 3, 4 and 5. In comparison, if the return candidates are determined initially with an window offset of 14 days 824, the best return assembly priority 826 only includes Order #'s 1, 2 and 3. This illustrates that a larger offset window may result in a smaller number of systems needed to supply the needed parts to manufacturing, and a corresponding lower impact on those that may be using the return assemblies. Because of this impact on changing the window offset, it is sometimes desirable to reprioritize all the return candidates when the widow offset is adjusted (step 316) as described above with reference to FIG. 3. Alternatively, both options shown in FIG. 8 can be given to the system user to allow the user to select which option is more desirable.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. An apparatus comprising:
   at least one processor;
   a memory coupled to the at least one processor; and
   an inventory management system with a pull back optimizer residing in the memory and executed by the at least one processor, where the pull back optimizer
   (A) determines net short parts for manufacturing an assembly;
   (B) selects an accelerated return window for return assemblies, where the accelerated return window is an offset time to return the return assemblies before they are scheduled to be returned;
   (C) determines return candidates as those return assemblies in the accelerated return window;
   (D) determines the optimum return candidates to fulfill the net short parts;
   (E) adjusts the accelerated return window and repeating steps C and D when there are net short parts requirements remaining; and
   (F) outputs the optimum return candidates to pull back to production for parts fulfillment.

2. The apparatus of claim 1 wherein the pull back optimizer determines the optimum return candidates to fulfill the net short parts by (G) prioritizing the return candidates; (H) selecting the best return candidate from the prioritized return candidates;
   updating the return candidates by removing the selected best return candidate; (I) updating the net short parts requirements; and (J) returning to (G) in the case where the updated short parts requirements are not satisfied and there are remaining return candidates.

3. The apparatus of claim 1 wherein the return assemblies are computers that are loaned to non-production entities within a manufacturing company that manufactures the assembly for testing and product development.

4. The apparatus of claim 1 wherein the net short parts requirements in step (A) is reduced by parts that will be available from return assemblies with a return date prior to when parts are needed to built the assemblies.

5. The apparatus of claim 1 wherein all the return candidates are re-prioritized when the widow offset is adjusted.

6. A computer-implemented method for determining retrieval of return assemblies for optimized parts fulfillment in an inventory management system, the method comprising the steps of:
   (A) providing a processor and a memory coupled to the processor for performing operations of a computer program; the computer program performing the steps of:
   (B) determining net short parts for manufacturing an assembly;
   (C) selecting an accelerated return window for return assemblies,
   where the accelerated return window is a offset time to return the return assemblies before they are scheduled to be returned;
   (D) determining return candidates as those return assemblies in the accelerated return window;
   (E) determining the optimum return candidates to fulfill the net short parts;
   (F) adjusting the accelerated return window and repeating steps C and D when there are net short parts remaining; and
   (G) outputting the optimum return candidates to pull back to production for parts fulfillment.

7. The method of claim 6 wherein step (D) comprises the steps of:
   (G) prioritizing the return candidates;
   (H) selecting the best return candidate from the prioritized return candidates;
   (I) updating the return candidates by removing the selected best return candidate;
   (J) updating the short parts requirements; and
   (K) returning to step (G) in the case where the updated short parts requirements are not satisfied and there are remaining return candidates.

8. The method of claim 6 wherein the return assemblies are computers that are loaned to non-production entities within a manufacturing company that manufactures the assembly for testing and product development.

9. The method of claim 6 wherein the net short parts requirements in step (A) is reduced by parts that will be available from return assemblies with a return date prior to when parts are needed to built the assemblies.

10. The method of claim 6 wherein all the return candidates are re-prioritized when the widow offset is adjusted.

11. A method for deploying computing infrastructure, comprising integrating computer readable code into a computing system, wherein the code in combination with the computing system perform the method of claim 6.

12. A computer-implemented method for determining retrieval of return assemblies for optimized parts fulfillment in an inventory management system, the method comprising the steps of:
    (A) providing a processor and a memory coupled to the processor for performing operations of a computer program; the computer program performing the steps of:
    (B) determining net short parts for manufacturing an assembly;
    (C) selecting an accelerated return window for return assemblies,
    where the accelerated return window is a offset time to return the return assemblies before they are scheduled to be returned;
    (D) determining return candidates as those return assemblies in the accelerated return window;
    (E) determining the optimum return candidates to fulfill the net short parts;
    (F) adjusting the accelerated return window and repeating steps C and D when there are net short parts remaining;
    (G) outputting the optimum return candidates to pull back to production for parts fulfillment;
    wherein the step (E) further comprises the steps of:
    (H) prioritizing the return candidates;
    (I) selecting the best return candidate from the prioritized return candidates;

(J) updating the return candidates by removing the selected best return candidate;
(K) updating the short parts requirements; and
(L) returning to step (H) in the case where the updated short parts requirements are not satisfied and there are remaining return candidates.

13. An article of manufacture comprising:
an inventory management system with a pull back optimizer residing in the memory and executed by the at least one processor, where the pull back optimizer
(A) determines net short parts for manufacturing an assembly;
(B) selects an accelerated return window for return assemblies, where the accelerated return window is an offset time to return the return assemblies before they are scheduled to be returned;
(C) determines return candidates as those return assemblies in the accelerated return window;
(D) determines the optimum return candidates to fulfill the net short parts;
(E) adjusts the accelerated return window and repeating steps C and D when there are net short parts requirements remaining; and
(F) outputs the optimum return candidates to pull back to production for parts fulfillment; and
computer-readable media bearing the inventory management system.

14. The article of manufacture of claim 13 wherein the pull back optimizer determines the optimum return candidates to fulfill the net short parts by (G) prioritizing the return candidates; (H) selecting the best return candidate from the prioritized return candidates; updating the return candidates by removing the selected best return candidate;
(I) updating the net short parts requirements; and (J) returning to (G) in the case where the updated short parts requirements are not satisfied and there are remaining return candidates.

15. The article of manufacture of claim 13 wherein the return assemblies are computers that are loaned to non-production entities within a manufacturing company that manufactures the assembly for testing and product development.

16. The article of manufacture of claim 13 wherein the net short parts requirements in step (A) is reduced by parts that will be available from return assemblies with a return date prior to when parts are needed to built the assemblies.

17. The article of manufacture of claim 13 wherein all the return candidates are re-prioritized when the widow offset is adjusted.

* * * * *